United States Patent [19]

Abramovitz et al.

[11] 4,426,134

[45] Jan. 17, 1984

[54] THREE AND FOUR PRODUCT SURFACE-WAVE ACOUSTO-OPTIC TIME INTEGRATING CORRELATORS

[75] Inventors: Irwin J. Abramovitz; Norman J. Berg, both of Baltimore, Md.; Michael W. Casseday, Washington, D.C.

[73] Assignee: The United States of America as represented by the Secretary of the Army, Washington, D.C.

[21] Appl. No.: 317,687

[22] Filed: Nov. 2, 1981

[51] Int. Cl.³ .............................................. G02F 1/11
[52] U.S. Cl. .................................... 350/358; 364/819
[58] Field of Search ................. 350/358, 169; 364/819

[56] References Cited

U.S. PATENT DOCUMENTS

| | | | |
|---|---|---|---|
| 4,093,976 | 6/1978 | Das | 350/358 |
| 4,110,016 | 8/1978 | Berg et al. | 350/358 |
| 4,124,280 | 11/1978 | Berg et al. | 350/358 |
| 4,124,281 | 11/1978 | Berg et al. | 350/358 |
| 4,139,277 | 2/1979 | Berg et al. | 350/358 |
| 4,225,938 | 9/1980 | Turpin | 350/358 |
| 4,326,778 | 4/1982 | Berg et al. | 350/358 |

OTHER PUBLICATIONS

U.S. Application Ser. No. 148,653, Berg et al., filed 5/12/80.
U.S. Application Ser. No. 251,605, Berg et al., filed 4/16/81.

*Primary Examiner*—James W. Davie
*Assistant Examiner*—Léon Scott, Jr.
*Attorney, Agent, or Firm*—Robert P. Gibson; Anthony T. Lane; Saul Elbaum

[57] ABSTRACT

A method and device for processing spread-spectrum and other wideband communications and radar signals to obtain three and four product correlated signals. A laser beam is split and shaped into first and second sheet beams. The first beam is directed to a first acousto-optic medium where it is doubly diffracted by first and second signals. The second beam is directed to a second acousto-optic medium which is spatially rotated 90° relative to the first acousto-optic medium where the second sheet beam is either singly diffracted by a third signal or doubly diffracted by a third signal and a fourth signal. The diffracted sheet beams are shaped into square beams, combined and directed to a photodiode area array.

12 Claims, 7 Drawing Figures

4 PRODUCT CORRELATOR

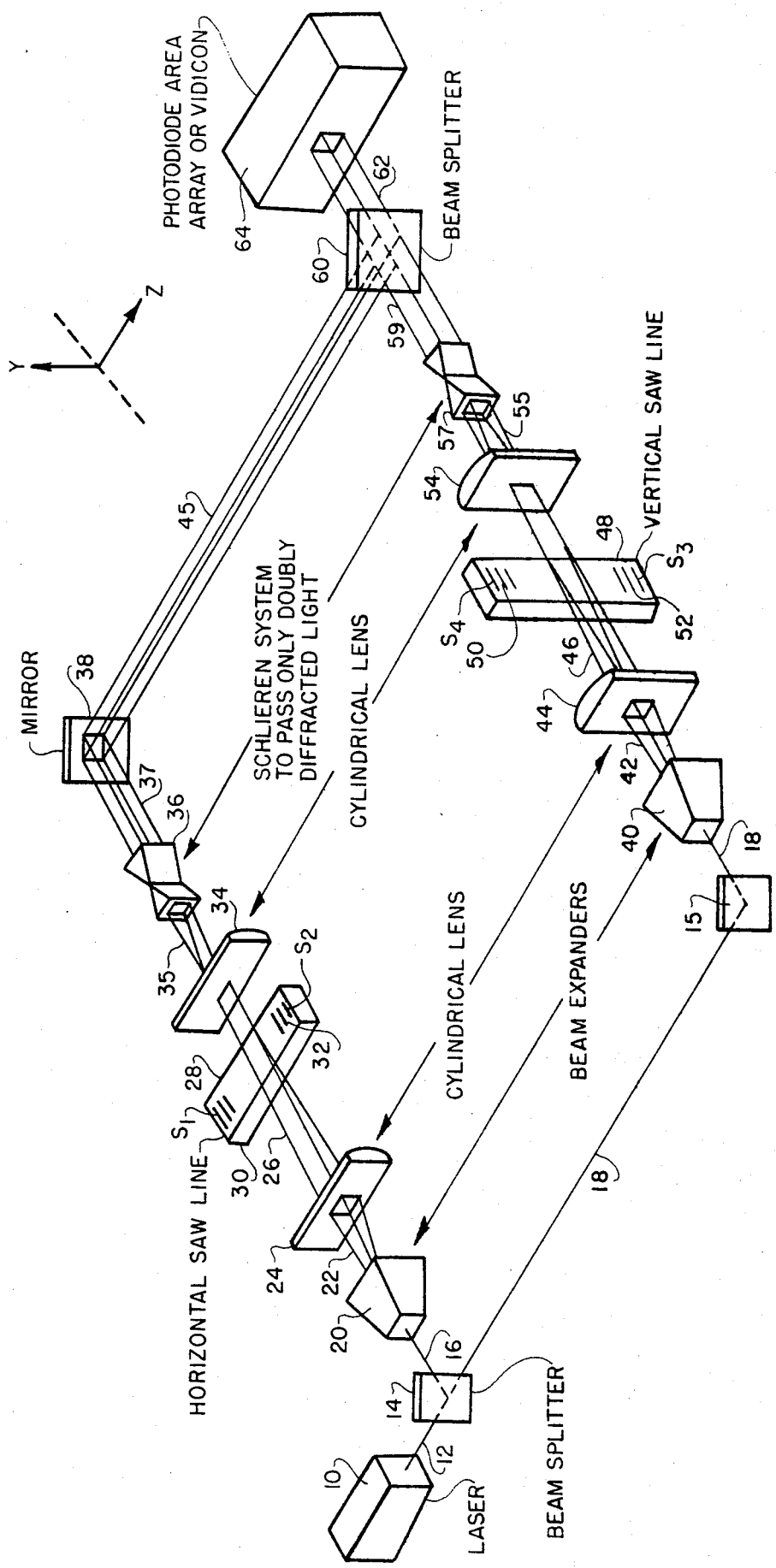

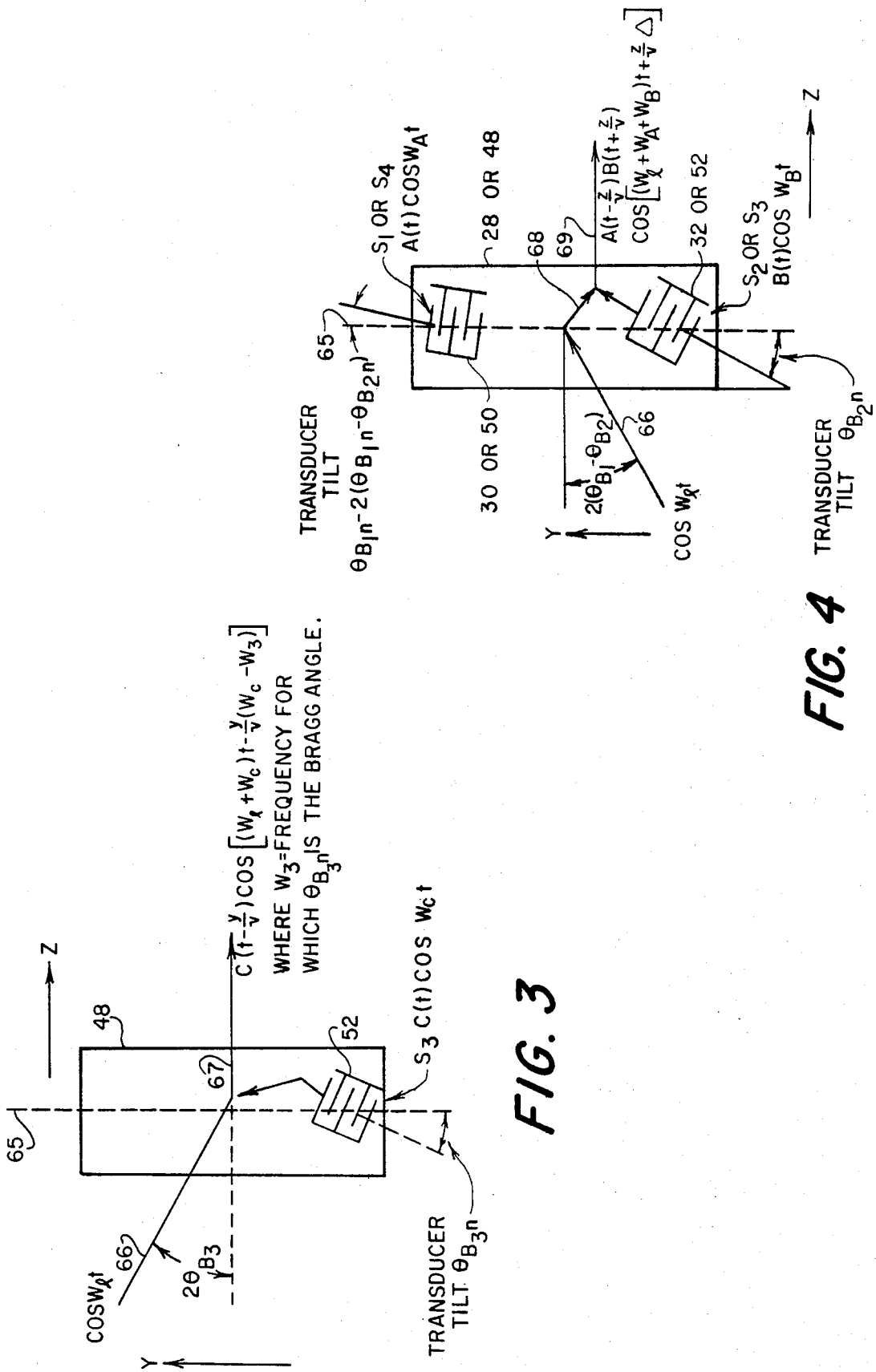

THREE AND FOUR PRODUCT SURFACE-WAVE ACOUSTO-OPTIC TIME INTEGRATING CORRELATORS

RIGHTS OF THE GOVERNMENT

The invention described herein may be manufactured, used or licensed by or for the government of the United States of America for governmental purposes without payment to us of any royalties therefor.

BACKGROUND OF THE INVENTION

This invention relates generally to surface wave, acousto-optic multi-product correlators, and more particularly to three and four product correlators which features the interference between two doubly diffracted beams from perpendicular surface acoustic wave (SAW) delay lines.

Current digital and microwave technology has made possible spread-spectrum and other wideband communications and radar systems for antijam and low probability of intercept protection. These systems present unique problems for which acousto-optics may provide solutions. The relative ease in applying multiple transducers to surface acoustic wave delay lines allows novel architectures for such signal processing functions as correlation or convolution. Where large processing gain is required, integration in time rather than space permits time-bandwidth products in excess of $10^6$. Coherent, interferometric schemes provide both time (e.g., time-difference-of-arrival) and frequency information simultaneously.

As is known, the correlation function serves many useful purposes in the processing of radar and communication signals. Specifically, it is most useful when attempting to extract weak signals from a noisy environment, such as radar return signals, and in the process of synchronizing a spread spectrum communications system.

The gain of a signal processing system is essentially proportional to the time-bandwidth product thereof, where time refers to the integration time, and this product is a figure of merit of a processor. The interaction time, which may be different than the integration time, is the specific time window which is being simultaneously integrated, and in general, it is desirable to maximize the interaction time as well as the time-bandwidth product.

One type of correlator which has been developed in recent years is the surface wave acousto-optic type device, exemplified in U.S. Pat. Nos. 4,110,016, 4,139,277 and 4,124,280 which are incorporated herein by reference. In such a device high frequency acoustic waves having envelopes corresponding to the signals to be correlated are propagated down piezoelectric crystals such as lithium niobate while a laser beam is directed across the crystals. The acoustic waves of the signals to be correlated diffract the coherent light, and upon suitable detection, the correlation function of the two signals is obtained. One limitation of the above described device is that it is often limited to use with signals having durations which are shorter than the interaction time of the device. The reason for this limitation is that the correlation integration is performed over a limited spatial variable, such as the length of the crystal delay line.

In U.S. Pat. No. 4,326,778, issued Apr. 27, 1982 to Berg et al and incorporated herein by reference, an acousto-optic time integrating correlator having a relatively high time bandwidth product as well as a relatively long interaction time is disclosed. While being an improvement, it is limited, when it is used as a cross-correlation signal detector, by any difference between the reference carrier frequency and the input signal carrier frequency. For example, it has been calculated that for a 30 ms integration time, the device is limited to processing signals which are separated by less than 200 Hz. However, it is frequently necessary to cross-correlate signals of greater frequency separation, for example, in a radar system where the return radar signal is Doppler-shifted by reflection off of a moving target.

In copending U.S. patent application, entitled "Acousto-optic Time Integrating Frequency Scanning Correlator", Ser. No. 251,605, filed Apr. 16, 1981, incorporated herein by reference, an acousto-optic time integrating two-dimensional frequency scanning correlator for cross-correlating signals which are separated in frequency is disclosed. In that application, two coherent light beams which are derived from the same laser are fed across respective Bragg cells, one cell having the signal $A(t) \cos \omega_A t$ propagating thereacross and the other cell having the signal $B(t) \cos \omega_B t$ propagating thereacross. The respective output beams are comprised in the x direction and expanded in the y direction and are made incident on an acousto-optical correlator device having chirp signals counter-propagating thereacross. The optical output is fed to a time-integrating photodiode array which provides an output signal corresponding to the cross-correlation of $A(t)$ and $B(t)$. In a further embodiment, the two Bragg cells are replaced by a single Bragg cell and beams having different polarizations are fed thereacross. In a still further embodiment, only a single crystal is used which has the $A(t)$ and $B(t)$ signals, as well as the chirp signals, counter-propagating thereacross. However, the architecture of the two-beam devices is very difficult to implement optically. The two-beam architecture has the two beams going in to the Bragg cell with four times the Bragg angle between them to insure that the left incoming input laser beam interacts primarily with the surface acoustic wave (SAW) produced by the left hand transducer to give an output beam and likewise the right incoming laser beam primarily interacts with the SAW generated by the right hand transducer to obtain a second output beam, i.e., two output beams that are essentially colinear are obtained. It is then necessary to do some spatial filtering.

The present invention provides a method and device that provides two-dimensional three and four product correlators that are simple to implement optically. In the present invention it is only necessary to deal with only one beam into and out of an acousto-optic medium at any given time. In the frequency scanning correlator, Application Ser. No. 251,605, there are embodiments wherein it is necessary to separate the beams, in other embodiments it is necessary to change polarization, and in some embodiments it is necessary to change vertical sheet beams to horizontal sheet beams. As can be appreciated by one of ordinary skill in the art these processes are very difficult to implement optically.

It is therefore one object of this invention to provide a method of processing spread-spectrum and other wideband communications and radar signals utilizing three and four-product surface-wave acousto-optic time integrating correlators.

It is another object of this invention to provide a method of processing spread-spectrum and other wideband communications and radar signals utilizing three and four-product surface-wave acousto-optic time integrating correlators which is simple to implement.

It is a further object of this invention to provide a method of processing spread-spectrum and other wideband communications and radar signals utilizing three and four-product surface-wave acousto-optic time integrating correlators wherein only one beam is input to the surface acoustic-wave device and only one beam is output from the surface acoustic-wave device.

It is still another object of this invention to provide a device for processing spread-spectrum and other wideband communications and radar signals utilizing three and four-product surface-wave acousto-optic time integrating correlators.

It is still a further object of this invention to provide a device for processing spread-spectrum and other wideband communications and radar signals utilizing three and four-product surface-wave acousto-optic time integrating correlators which is simple to implement.

It is also another object of this invention to provide a device for processing spread-spectrum and other wideband communications and radar signals utilizing three and four-product surface-wave acousto-optic time integrating correlators wherein only one beam is input to the surface acoustic-wave device and only one beam is output from the surface acousto-wave device.

Other objects, advantages and novel features of the present invention will become apparent from the following detailed description of the invention when considered in conjunction with the accompanying drawings.

SUMMARY OF THE INVENTION

These and other objects, features and advantages of the invention are accomplished by a method and device wherein the beam from a single laser source is split into first and second beams. The first beam is shaped into a sheet beam and directed across a first acousto-optic medium where it is doubly diffracted by a first and second signal propagating thereacross. The second beam is shaped into a sheet beam and directed across a second acousto-optic medium which is spatially rotated 90° from the first acousto-optic medium where it is either singly or doubly diffracted by a third or a third and fourth signal propagating thereacross. The first and second interacted beams are recombined and directed to a detector which outputs the three or four product correlated signal. The first, second, third and fourth signals are applied to acoustic transducers disposed on the surface of the acousto-optic medium which is Y—Z lithium niobate. The acoustic transducers are tilted with respect to an axis of the acousto-optic medium.

BRIEF DESCRIPTION OF THE DRAWINGS

The above and further objects and novel features of the invention will more fully appear from the following description when the same is read in connection with the accompanying drawings. It is to be understood, however, that the drawings are for the purpose of illustration only, and are not intended as a definition of the limits of the invention.

FIG. 2 is schematic of a four product correlator as taught in the present application.

FIG. 3 is a drawing illustrating the disposition of a single acoustic transducer on an acousto-optic medium.

FIG. 4 is a drawing illustrating the disposition of two acoustic transducers on an acousto-optic medium.

DESCRIPTION OF THE PREFERRED EMBODIMENTS

Figure 1:
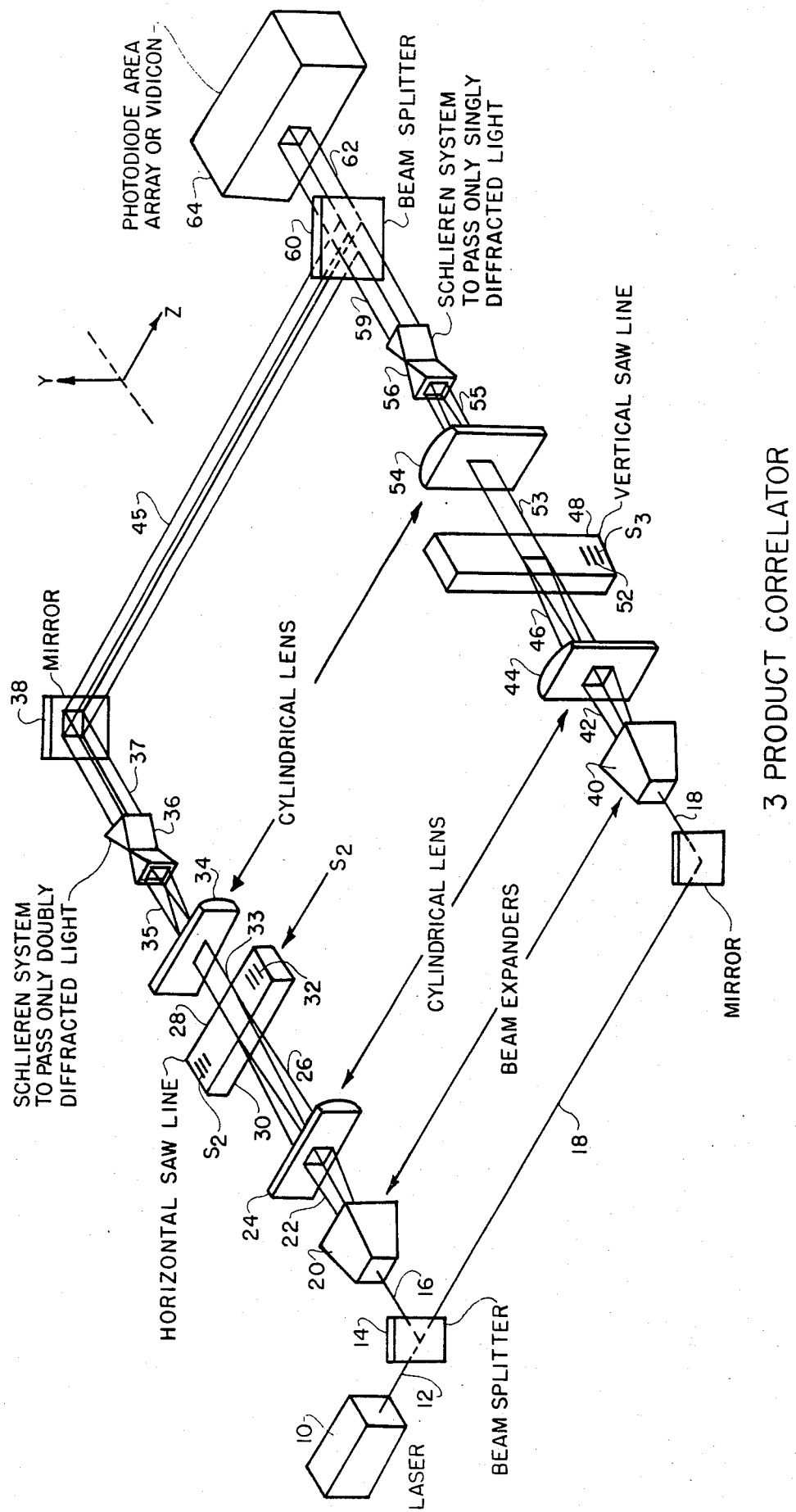
FIG. 1 is schematic of a three product correlator as taught in the present application.

Referring now to the drawings, FIG. 1 is a schematic of the three product correlator as taught in the present invention. A laser 10 outputs a single laser beam 12 which is split into two beams 16 and 18 by beam splitter 14. Beam 16 is inputted to a beam expander 20 which expands the beam into a square beam 22 which is shaped into a horizontal sheet beam, represented at 26, by a cylindrical lens 24. The horizontal sheet beam 26 is directed across a horizontal planar surface of an acousto-optic medium 28 which has acoustic transducers 30 and 32 disposed on the surface thereof. Signals $S_1$ and $S_2$ are applied to transducers 30 and 32 respectively and are caused to propagate along the surface of the acousto-optic medium where they interact with sheet beam 26 causing a first and second diffraction of sheet beam 26. The doubly diffracted beam, represented at 33, is shaped by cylindrical lens 34 into a square beam and is directed to a Schlieren system 36 which passes only doubly diffracted light. The doubly diffracted light, represented at 39 is directed by mirror 38 to a beam splitter 60.

The beam 18 is directed by mirror 15 to a beam expander 40 which expands the beam 18 into a square beam, represented at 42, which is shaped by cylindrical lens 44 into a vertical sheet beam, represented at 46, which is directed across the surface of an acousto-optic medium 48 which has an acoustic transducer 52 disposed on the vertical planar surface thereof. A signal $S_3$ is applied to transducer 52 and is caused to propagate along the surface of the acousto-optic medium where it interacts with sheet beam 46 causing a first diffraction of sheet beam 46. The singly diffracted beam, represented at 53, is shaped by cylindrical lens 54 into a square beam and is directed to a Schlieren system 56 which only passes singly diffracted light. The singly diffracted light, represented at 59, is passed through beam splitter 60 and is combined with doubly diffracted light, represented at 45, and is then directed to a photodiode area array or vidicon 64.

Referring now to FIG. 2, which is a schematic representation of the four product correlator as taught in the present invention, like numerals represent like components as shown in FIG. 1. The only differences between FIGS. 1 and 2 are that acousto-optic medium 48 has an additional transducer 50 to which a fourth signal is applied causing sheet beam 46 to be doubly diffracted and the Schlieren system 57 passes doubly diffracted light rather than singly diffracted light as shown in FIG. 1, by Schlieren system 56.

Referring now to FIG. 3, there is shown an acousto-optic medium 48 with one acoustic transducer 52 disposed thereon. The acoustic transducer is tilted with respect to the axis 65 of the medium 48 by an angle $\theta_{B_3}n$, where $\theta_{B_3}n$ is the Bragg angle in the acousto-optic medium for which n is the index of refraction. A signal $S_3$ is applied to acoustic transducer 52 causing the signal to propagate substantially parallel to axis 65 and towards the opposite end of the transducer where it causes a diffraction of the incoming sheet beam represented by 66 at 67.

Referring now to FIG. 4, there is shown an acousto-optic medium 28 or 48, (numerals refer to devices shown in either FIGS. 1 or 2), with two acoustic transducers disposed thereon. The acoustic transducer 30 or 50 is tilted with respect to the axis 65 of the medium 28 or 48 by an angle $\theta_{B1}n - 2(\theta_{B1}n - \theta_{B2}n)$ and the acoustic transducer 32 or 52 is tilted with respect to the axis 65 by an angle $\theta_{B2}n$. A signal $S_1$ or $S_4$ is applied to acoustic transducer 30 or 50 causing the signal to propagate substantially parallel to axis 65 and towards the opposite end of the transducer where it causes a first diffraction, represented at 68, of incoming beam 66. A signal $S_2$ or $S_3$ is applied to acoustic transducer 32 or 52 causing the signal to propagate substantially parallel to axis 65 and towards the opposite end of the transducer where it causes a second diffraction, represented at 69 of incoming beam 66. For a more detailed discussion of acoustic media, acoustic transducers, and acoustic-optic phenomenon in general, the reader is referred to the above mentioned U.S. Pat. Nos. 4,326,778, 4,110,016, 4,139,277 and 4,124,280 which are incorporated herein by reference.

The operation of the four product correlator shown in FIG. 2 will now be explained by reference to FIGS. 2 and 4. The operation of the three product correlator shown in FIGS. 1 and 3 will then be apparent to a person of ordinary skill in the art and thus will not be explained. FIG. 2 represents a two-dimensional, four product correlator which features the interference between two doubly diffracted beams from perpendicular surface acoustic wave (SAW) delay lines. As shown in FIG. 2, the initial source of the sheet beams 26 and 46 is a single laser 10. Since the SAW devices are perpendicular, interaction is only one device in between light polarized perpendicular to the direction of travel of the SAW's in that device. This is the preferred polarization; for light polarized parallel to the direction of SAW propagation, the diffraction efficiency may be somewhat reduced and a broadening of the Bragg angle dependence is experienced.

The double diffraction effect is diagrammed in FIG. 4 for the horizontal SAW device. The light from the first diffraction is of the form:

$$L_{H1}(t,z) = \qquad (1)$$

$$A\left(t - \frac{z}{v}\right) \cos\left[\omega_l\left(t + \frac{z\sin\phi_1}{c}\right) + \omega_A\left(t - \frac{z}{v}\right)\right]$$

The doubly diffracted light is then of the form:

$$L_{H2}(t,z) = A\left(t - \frac{z}{v}\right) B\left(t + \frac{z}{v}\right) \cos\left[\omega_l\left(t + \frac{z\sin\phi_1}{c}\right) + \omega_A\left(t - \frac{z}{v}\right) + \omega_B\left(t + \frac{z}{v}\right)\right]. \qquad (2)$$

Since $\phi_1 = 2(\theta_{B1} - \theta_{B2})$, then $\sin \phi_1 \approx (\omega_1/v)/(\omega_l/C) - (\omega_2/v)/(\omega_l/C)$, and equation (2) reduces to:

$$L_{H2}(t,z) = \qquad (3)$$

$$A\left(t - \frac{z}{v}\right) B\left(t + \frac{z}{v}\right) \cos\left[(\omega_l + \omega_A + \omega_B)t + \frac{z}{v}\Delta_H\right],$$

where $\Delta_H = (\{\omega_1 - \omega_2\} - \{\omega_A - \omega_B\})$.

Here, $\omega_1$ and $\omega_2$ are design center frequencies for which the Bragg angles in air (i.e., n=1) are $\theta_{B1}$ and $\theta_{B2}$, respectively. The frequencies $\omega_1$ and $\omega_2$ are selected to be different so that the doubly diffracted light may be separated from the undiffracted beam. Similarly, for the vertical device, the doubly diffracted light is $$L_{V2}(t,z) = \qquad (4)$$

$$C\left(t - \frac{y}{v}\right) D\left(t + \frac{y}{v}\right) \cos\left[(\omega_l + \omega_C + \omega_D)t + \frac{y}{v}\Delta_V\right],$$

where $\Delta_{V2} = (\{\omega_3 - \omega_4\} - \{\omega_C - \omega_D\})$.

Those doubly diffracted beams are imaged onto a photodiode area array or a vidicon 64 that integrates the output current which is proportional to the square of the sum of these beams. The frequency difference term derived from the cross product, which is proportional to $L_{H2}(t,z) Y - L_{V2}(t,y)$, produces an output voltage $$V(t,z,y) = \int_T A\left(t - \frac{z}{v}\right) B\left(t + \frac{z}{v}\right) C\left(t - \frac{y}{v}\right) D\left(t + \frac{y}{v}\right) \cos\left[(\omega_A + \omega_B - \omega_C - \omega_D)t + \frac{z}{v}\Delta_H - \frac{y}{v}\Delta_V\right] dt. \qquad (5)$$

If $(\omega_A + \omega_B) = (\omega_C + \omega_D)$, then equation (5) reduces to $$V(t,z,y) = \cos\left[\frac{z}{v}\Delta_H - \frac{y}{v}\Delta_V\right] \int_T A\left(t - \frac{z}{v}\right) B\left(t + \frac{z}{v}\right) C\left(t - \frac{y}{v}\right) D\left(t - \frac{y}{v}\right) dt. \qquad (6)$$

For $(\omega_1 - \omega_2) = (\omega_A - \omega_B)$ and $(\omega_3 - \omega_4) = (\omega_C - \omega_D)$, this further reduces to:

$$\int_T A\left(t - \frac{z}{v}\right) B\left(t + \frac{z}{v}\right) C\left(t - \frac{y}{v}\right) D\left(t + \frac{y}{v}\right) dt.$$

Thus, this device provides a two-dimensional, four-product correlation. It has the additional ability to measure some degree of deviation from design frequencies. The usefulness of this correlator for processing signals containing doppler shifts in frequency such as expected in a radar system shown in FIG. 5 can be shown by replacing the generalized input signals to the vertical SAW delay line 48, i.e., C(t) cos $\omega_C$t and D(t) cos $\omega_D$t, by linear FM chirp signals, cos ($\omega_C+\alpha t$)t and cos ($\omega_D-\alpha t$)t. Equation (4) becomes:

$$L_{v2}(t,y) = \cos\left[(\omega_I + \omega_C + \omega_D)t + \frac{y}{v}\Delta_H - 4\alpha\left(\frac{y}{v}\right)t\right]. \quad (8)$$

The output voltage then becomes:

$$V(t,z,y) = \int_T A\left(t - \frac{z}{v}\right) B\left(t + \frac{z}{v}\right) \cos\left[(\omega_A + \omega_B - \omega_C - \omega_D)t + \frac{z}{v}\Delta_H - \frac{y}{v}\Delta_v + 4\alpha\left(\frac{y}{v}\right)t\right] dt. \quad (9)$$

If $\omega_B = \omega_B + \omega_{DP}$ where $\omega_{DP}$ is an unknown doppler shift and $\omega_A + \omega_B = \omega_C + \omega_D$, then equation (9) reduces to:

$$V(t,z,y) = \int_T A\left(t - \frac{z}{v}\right) B\left(t + \frac{z}{v}\right) \cos\left[\left(\omega_{OP} + 4\alpha\frac{y}{v}\right)t + \frac{z}{v}\Delta_H - \frac{y}{v}\Delta_v\right] dt.$$

Figure 6:
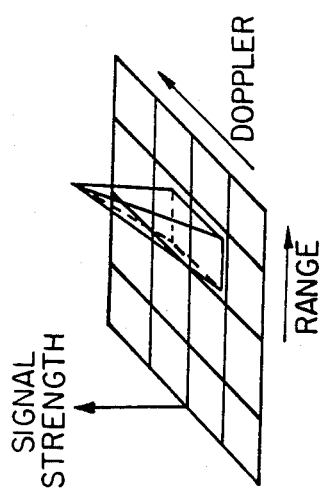
FIG. 6 is a graphical representation of the signal obtained from the radar system shown in FIG. 5.
Figure 7:
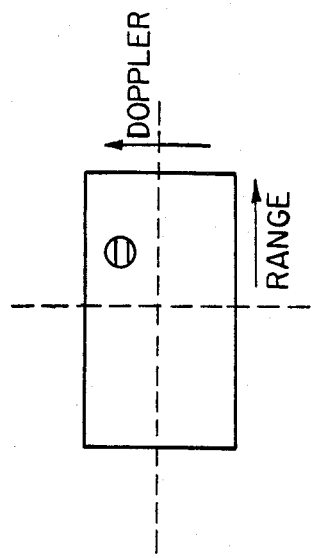
FIG. 7 is a graphical representation of the signal that would be seen on a vidicon derived from the radar system shown in FIG. 5.
Figure 5:
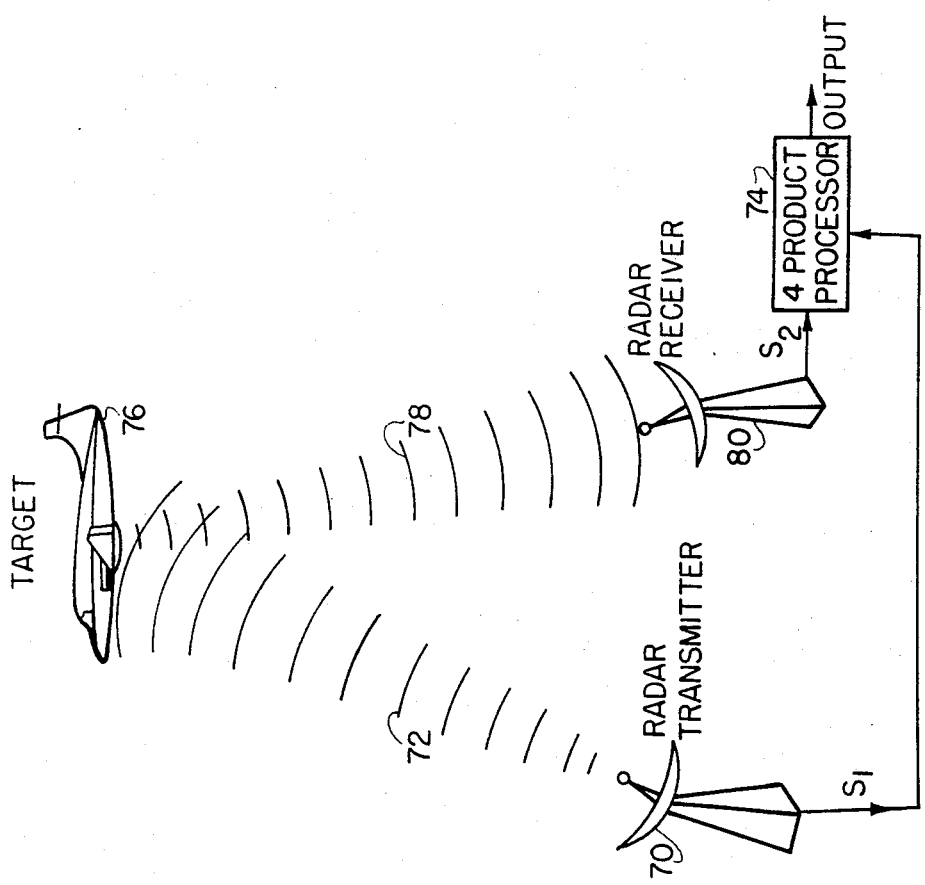
FIG. 5 is a representation of a radar system utilizing a four product correlator of the present invention.

It can be seen that there is a y position for which $\omega_{DP} = -4\alpha y/v$ and the doppler shift is compensated. FIGS. 5 and 6 illustrate a direct sequence spread-spectrum radar system using this four product correlator. A radar transmitter 70 transmits a radar signal, represented at 72, and a sample of the transmitted signal $S_1$ is relayed to a four product correlator of the present invention. The radar signal 72 is reflected from a target, represented at 76, and the reflected signal 78 is received by a receiver 80. This signal $S_2$ is relayed to the four product correlator 74 of the present invention. FIG. 6 graphically illustrates, in three dimension, the output of the four product correlator. The tip of the pyramid represents the position of the target and has coordinates of signal strength, range and doppler. FIG. 7 is an illustration of how the output of the four product correlator 74 of the radar system would look on a vidicon display. Correlation of the direct sequence code in the horizontal dimension provides range information, and doppler compensation in the vertical dimension provides velocity data. The output, shown in FIG. 7, represents a situation in which $\Delta_H$ and $\Delta_V$ are nonzero.

While the invention has been described with reference to the accompanying drawings, it is to be clearly understood that the invention is not to be limited to the particular details shown therein as obvious modifications may be made by those skilled in the art. The embodiment of the invention should only be construed within the scope of the following claims.

What we claim is:

1. A device for processing spread-spectrum and other wideband communications and radar signals to obtain at least a three product, time integrated, correlated output signal, comprising:

a source of a laser light beam;
beam splitting means for splitting the laser light beam into a first beam and a second beam;
first beam forming means for forming the first beam into a first sheet beam;
second beam forming means for forming the second beam into a second sheet beam, the plane of the second sheet beam being orthogonal to the plane of the first sheet beam;
a first acousto-optic medium, having an axis and a planar surface extending between opposite first and second ends, which is disposed in the path of the first sheet beam such that the first sheet beam traverses the first medium intermediate the first medium ends along and parallel to the first medium surface;
a second acousto-optic medium, having an axis and a planar surface extending between opposite first and second ends, which is disposed in the path of the second sheet beam such that the plane of the second medium surface is normal to the plane of the first medium surface and the second sheet beam traverses the second medium intermediate the second medium ends along and parallel to the second medium surface;
a first acoustic transducer, disposed at the first end of the first acousto-optic medium and supplied with a first signal to be correlated, for propagating the first signal on the first medium surface in the direction of the second end of the first acousto-optic medium so as to cause a first diffraction of the first sheet beam with the first signal;
a second acoustic transducer, disposed at the second end of the first acousto-optic medium and supplied with a second signal to be correlated, for propagating the second signal on the first medium surface in the direction of the first end of the first acousto-optic medium so as to cause a second diffraction of the first sheet beam with the second signal;
a third acoustic transducer, disposed at the first end of the second acousto-optic medium and supplied with a third signal to be correlated, for propagating the third signal on the second medium surface in the direction of the second end of the second acousto-optic medium so as to cause a first diffraction of the second sheet beam with the third signal;
first beam shaping means, disposed in the path of the diffracted first sheet beam, for shaping the diffracted first sheet beam into a first rectangular beam;
second beam shaping means, disposed in the path of the diffracted second sheet beam, for shaping the diffracted second sheet beam into a second rectangular beam;
beam combining means for combining the first and second rectangular beams; and
time integrating photodetecting means, disposed in the path of the combined beans for generating the at least three product, time integrated, correlated output signal from the combined beams.

2. A device, as recited in claim 1, which further comprises:

a fourth acoustic transducer, disposed at the second end of the second acousto-optic medium and supplied with a fourth signal to be correlated, for propagating the fourth signal on the second medium surface in the direction of the first end of the second acousto-optic medium so as to cause a second diffraction of the second sheet beam with the fourth signal; whereby the photodetecting means generates a four product, time integrated, correlated output signal.

3. A device, as recited in claim 1, wherein the first and second rectangular beams are square beams.

4. A device, as recited in claim 1, wherein the time integrating photodetecting means comprises a photodiode area array.

5. A device, as recited in claim 1, wherein the first and second acousto-optic mediums each comprises a surface acoustic wave device built on Y—Z lithium niobate.

6. A device, as recited in claim 1, wherein:
the first acoustic transducer is disposed at an angle relative to the axis of the first acousto-optic medium which is equal to $\theta_{B1n} - 2(\theta_{B1n} - \theta_{B2n})$, where $\theta_{B1n}$ and $\theta_{B2n}$ are the Bragg angles for the first and second signals, respectively, in the first acousto-optic medium for which n is the index of refraction;
the second acoustic transducer is disposed at an angle relative to the axis of the first acousto-optic medium which is equal to $\theta_{B2n}$; and
the first acousto-optic medium is disposed such that the path of the incoming first sheet beam deviates from a path normal to the first medium axis by an angle which is equal to $2(\theta_{B1} - \theta_{B2})$, where $\theta_{B1}$ and $\theta_{B2}$ are the Bragg angles for the first and second signals, respectively, in air.

7. A device, as recited in claim 6, which further comprises:
a fourth acoustic transducer, disposed at the second end of the second acousto-optic medium and supplied with a fourth signal to be correlated, for propagating the fourth signal on the second medium surface in the direction of the first end of the second acousto-optic medium so as to cause a second diffraction of the second sheet beam with the fourth signal;
whereby the photodetecting means generates a four product, time integrated, correlated output signal.

8. A device, as recited in claim 1, wherein:
the third acoustic transducer is disposed at an angle relative to the axis of the second acousto-optic medium which is equal to $\theta_{B3n}$, where $\theta_{B3n}$ is the Bragg angle for the third signal in the second acousto-optic medium for which n is the index of refraction; and
the second acousto-optic medium is disposed such that the path of the incoming second sheet beam deviates from a path normal to the second medium axis by an angle which is equal to $2\theta_{B3}$, where $\theta_{B3}$ is the Bragg angle for the third signal in air.

9. A device for obtaining a two-dimensional four product correlation by processing spread spectrum radar signals comprising:
a source of a laser beam;
beam splitting and shaping means for dividing and shaping the laser beam into first and second sheet beams, the plane of the second sheet beam being orthogonal to the plane of the first sheet beam;
a first acousto-optic medium, having a planar surface extending between opposite first and second ends, which is disposed in the path of the first sheet beam such that the first sheet beam traverses the first medium intermediate the first medium ends along and parallel to the first medium surface;
a second acousto-optic medium, having a planar surface extending between opposite first and second ends, which is disposed in the path of the second sheet beam such that the plane of the second medium surface is normal to the plane of the first medium surface and the second sheet beam traverses the second medium intermediate the second medium ends along and parallel to the second medium surface;
transmitting means for transmitting a radar signal;
signal sampling means for sampling and relaying the transmitted radar signal to the first acousto-optic medium;
a first acoustic transducer, disposed at the first end of the first acousto-optic medium and supplied with the transmitted radar signal, for propagating the transmitted radar signal on the first medium surface in the direction of the second end of the first acousto-optic medium so as to cause a first diffraction of the first sheet beam with the transmitted radar signal;
signal receiving means for receiving a reflected signal portion of the transmitted radar and relaying the reflected signal to the first acousto-optic medium;
a second acoustic transducer, disposed at the second end of the first acousto-optic medium and supplied with the reflected signal, for propagating the reflected signal on the first medium surface in the direction of the first end of the first acousto-optic medium so as to cause a second diffraction of the first sheet beam with the reflected signal;
a third acoustic transducer, disposed at the first end of the second acousto-optic medium and supplied with a first FM linear chirp signal, for propagating the first FM linear chirp signal on the second medium surface in the direction of the second end of the second acousto-optic medium so as to cause a first diffraction of the second sheet beam with the first FM linear chirp signal;
a fourth acoustic transducer, disposed at the second end of the second acousto-optic medium and supplied with a second FM linear chirp signal, for propagating the second FM linear chirp signal on the second medium surface in the direction of the first end of the second acousto-optic medium so as to cause a second diffraction of the second sheet beam with the second FM linear chirp signal;
beam shaping means for shaping the diffracted first and second sheet beams into respective square beams; and
beam combining and directing means for combining and directing the square beams to a photodiode area array.

10. A method of processing spread-spectrum and other wideband communications and radar signals to obtain at least a three product, time integrated, correlated output signal, comprising the steps of:
splitting a laser light beam into a first laser beam and a second laser beam;
converting the first laser beam into a first sheet beam;
converting the second laser beam into a second sheet beam, the plane of the second sheet beam being orthogonal to the plane of the first sheet beam;
directing the first sheet beam to a first acousto-optic medium, having a planar surface extending between opposite ends, so that the first sheet beam traverses the first acousto-optic medium intermediate the first medium ends along and parallel to the planar surface of the first acousto-optic medium;

directing the second sheet beam to a second acousto-optic medium, having a planar surface extending between opposite ends, so that the second sheet beam traverses the second acousto-optic medium intermediate the second medium ends along and parallel to the planar surface of the second acousto-optic medium, which is orthogonal to the planar surface of the first acousto-optic medium;

propagating a first signal to be correlated on the planar surface of the first acousto-optic medium in a first direction toward one end of the first acousto-optic medium so as to cause a first diffraction of the first sheet beam with the first signal;

propagating a second signal to be correlated on the planar surface of the first acousto-optic medium in a second direction toward the other end of the first acousto-optic medium so as to cause a second diffraction of the first sheet beam with the second signal;

propagating a third signal to be correlated on the planar surface of the second acousto-optic medium in a third direction toward one end of the second acousto-optic medium so as to cause a first diffraction of the second sheet beam with the third signal;

converting the diffracted first and second sheet beams into first and second rectangular beams, respectively;

combining the first and second rectangular beams; and directing the combined beam to a time integrating photodetector for converting the combined beam to the at least three product, time integrated, correlated output signal.

11. A method, as recited in claim 10, further comprising the step of propagating a fourth signal to be correlated on the planar surface of the second acousto-optic medium in a fourth direction toward the other end of the second acousto-optic medium so as to cause a second diffraction of the second sheet beam with the fourth signal, whereby the output signal is a four product, time integrated, correlated signal.

12. A method of obtaining a two-dimensional four product correlating by processing spread spectrum radar signals comprising the steps of:

dividing and shaping a laser beam into first and second sheet beams, the plane of the second sheet beam being orthogonal to the plane of the first sheet beam;

directing the first sheet beam to a first acousto-optic medium, having a planar surface extending between opposite ends, so that the first sheet beam traverses the first acousto-optic medium intermediate the first medium ends along and parallel to the planar surface of the first acousto-optic medium;

directing the second sheet beam to a second acousto-optic medium, having a planar surface extending between opposite ends, so that the second sheet beam traverses the second acousto-optic medium intermediate the second medium ends along and parallel to the planar surface of the second acousto-optic medium, which is orthogonal to the planar surface of the first acousto-optic medium;

sampling a transmitted radar signal transmitted by a radar transmitter;

propagating the sampled transmitted radar signal on the planar surface of the first acousto-optic medium in a first direction toward one end of the first acousto-optic medium so as to cause a first diffraction of the first sheet beam with the sampled transmitted radar signal;

receiving a reflected signal portion of the transmitted radar signal reflected from a target;

propagating the reflected signal on the planar surface of the first acousto-optic medium in a second direction toward the other end of the first acousto-optic medium so as to cause a second diffraction of the first sheet beam with the reflected signal;

propagating a first linear FM chirp signal on the planar surface of the second acousto-optic medium in a third direction toward one end of the second acousto-optic medium so as to cause a first diffraction of the second sheet beam with the first linear FM chirp signal;

propagating a second linear FM chirp signal on the planar surface of the second acousto-optic medium in a fourth direction toward the other end of the second acousto-optic medium so as to cause a second diffraction of the second sheet beam with the second linear FM chirp signal;

shaping the diffracted first and second sheet beams into first and second square beams, respectively;

combining the first and second square beams; and directing the combined square beams to a photodiode area array.

* * * * *